United States Patent [19]

Mattei

[11] 4,410,116
[45] Oct. 18, 1983

[54] ADJUSTABLE-DROP PACKAGE CARRIER RACK FOR TWO-WHEEL VEHICLES SUCH AS BICYCLES

[76] Inventor: Joseph Mattei, P.O. Box 1451, Chicago, Ill. 60690

[21] Appl. No.: 315,158

[22] Filed: Oct. 26, 1981

[51] Int. Cl.³ .............................................. B62J 7/04
[52] U.S. Cl. .................................. 224/40; 224/30 R; 224/33 R; 280/202
[58] Field of Search ..................... 224/31, 32 R, 33 R, 224/39, 30 R, 32 A, 40, 33 A, 37, 35, 36, 38, 41; 280/202, 289 A, 289 R; 411/91

[56] References Cited

U.S. PATENT DOCUMENTS

| | | | |
|---|---|---|---|
| 740,905 | 10/1903 | Otterbein | 280/202 |
| 1,741,077 | 12/1929 | Rusack | 411/91 |
| 3,220,623 | 11/1965 | Bostwick | 224/32 |
| 3,286,891 | 11/1966 | Jones, Jr. | 224/39 |
| 3,572,561 | 3/1971 | McCauley | 224/32 A |
| 3,779,435 | 12/1973 | Niemann | 224/37 |
| 3,791,563 | 2/1974 | Raat | 224/30 R |
| 3,827,613 | 8/1974 | Meyer | 224/40 |
| 3,910,471 | 10/1975 | Niemann | 224/39 |
| 3,924,775 | 12/1975 | Andreaggi et al. | 220/96 |
| 4,113,158 | 9/1978 | Niemann | 224/39 |
| 4,174,796 | 11/1979 | Nakamura | 224/39 |

FOREIGN PATENT DOCUMENTS

| | | | |
|---|---|---|---|
| 444559 | 5/1927 | Fed. Rep. of Germany | 224/39 R |
| 165161 | 6/1949 | Fed. Rep. of Germany | 224/41 |
| 934089 | 10/1955 | Fed. Rep. of Germany | 224/39 R |
| 741029 | 2/1933 | France | 224/32 A |
| 510334 | 1/1955 | Italy | 224/32 A |
| 11894 | of 1912 | United Kingdom | 280/202 |

Primary Examiner—Allan N. Shoap
Assistant Examiner—Robert Petrik
Attorney, Agent, or Firm—John H. Shurtleff

[57] ABSTRACT

A bicycle carrier rack for placement over the rear wheel of the bicycle, including a primary support member mounted in a substantially horizontal support plane and attached at one end to the seat support member of the bicycle, a secondary pivotal support member rotatably connected to and angularly depending from the primary support member, and a pair of lockable, telescoping members attached to the secondary pivotal support member and to the frame of the bicycle, adjustable to provide a range of angular positions for the secondary pivotal support member.

11 Claims, 4 Drawing Figures

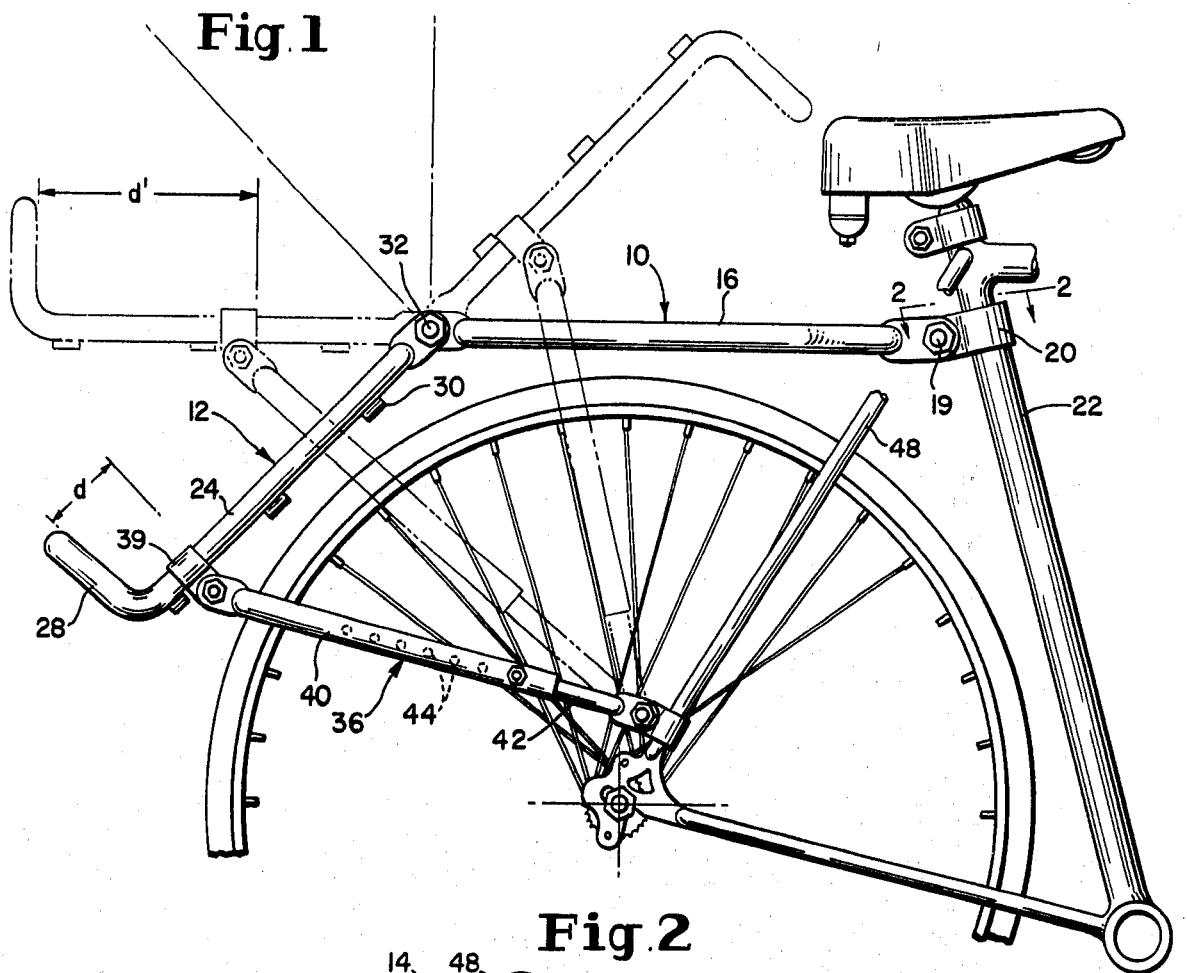
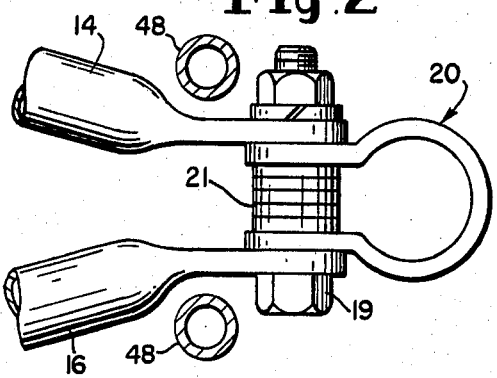
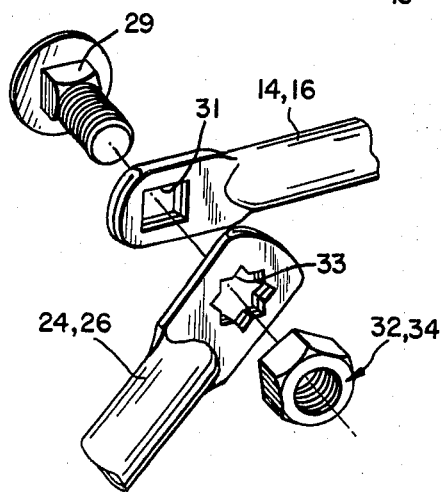
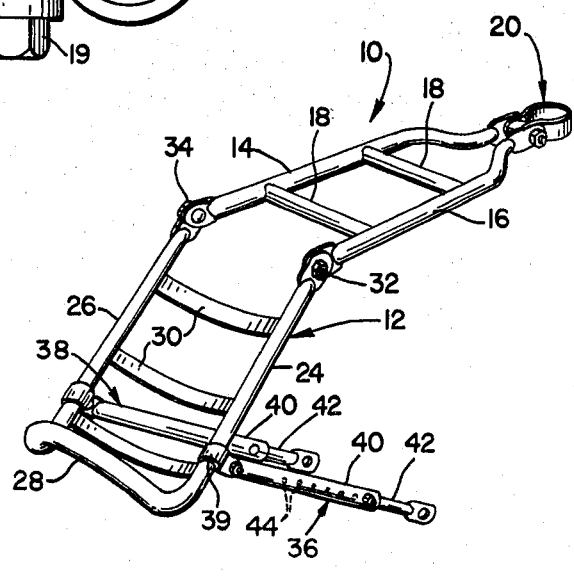

ADJUSTABLE-DROP PACKAGE CARRIER RACK FOR TWO-WHEEL VEHICLES SUCH AS BICYCLES

BACKGROUND OF THE INVENTION

The present invention relates generally to a package carrier rack for two-wheeled vehicles and, in particular, to a bicycle carrier rack attached at one end to the bicycle seat support member and supported over the rear wheel of a bicycle. The rear portion of said carrier rack includes an angular support member that provides an additional support surface. This latter support member is rotatably connected to the primary, substantially horizontal support member and is supported by telescoping supporting members, to allow for a range of angular positions above and below horizontal.

Bicycle carrier racks are usually designed to consist of one substantially horizontal support member that is attached to one end to the main frame of the bicycle and supported over the rear wheel of the bicycle by unadjustable support struts. In this construction, the support member generally does not extend rearward substantially beyond the rear wheel of the bicycle. The reason is that such an extended configuration, if permanent, would be structurally weak under continued use and would increase the overall length of the bicycle, decreasing its maneuverability. However, restricting the length of the carrier rack to the rearmost extension of the rear wheel of the bicycle also limits the surface area of the carrier rack and limits the volume of packages that the rack may safely carry. The present invention solves this problem of maximizing the available support surface area without substantially increasing the overall length of the bicycle by providing a carrier rack with an additional support member angularly depending from the rear of the primary support member. As a result of this construction, the carrier rack of the present invention provides more support surface than usual bicycle racks, but does not substantially decrease maneuverability of the bicycle because of its novel construction which enables the carrier rack to roughly track the contour of the rear wheel of the bicycle, thereby minimizing "overhang" of the carrier rack. Additionally, packages supported by the angularly depending secondary support member of the present invention have a lower center of gravity relative to packages carried on present carrier racks. As a result, the stability of a bicycle, using the present invention, is enhanced. The superior carrying ability of the present invention is further improved by the presence of concave cross-members on the angularly depending secondary support member. When the secondary support member is in a dropped position, i.e., a position depending below the horizontal, this construction is particularly suitable for cradling a bag of groceries, or other packaged material that would tend to conform to the contour of the crossmembers.

Present bicycle carrier racks are also usually constructed so as to be supported above the rear wheel of a bicycle by fixed length supporting struts. The disadvantages of this construction is that when such a carrier rack is used on bicycles of various styles and wheel diameters, the support surface of the rack may be disposed substantially out of horizontal due to the unadjustable length of the supporting struts. The present invention, however, includes telescoping supporting members that are lockable in a predetermined telescoped position. These telescoping supporting members are attached to the support surface of the carrier rack at the angularly depending additional support member, which may also be rotatably connected to the primary support member to provide additional flexibility in positioning. As a result of this construction, the present invention may be used on bicycles of various configurations, to provide a substantially horizontal primary support surface.

In addition, the rotatably connected secondary support member of the present invention allows the user to select a desired support surface configuration. The present invention may thus be adapted to carry packages of various and unusual shapes and sizes more effectively than present carrier racks. It should be noted that no present carrier rack includes an adjustable rear portion supported by telescoping supporting members, as is taught in the present invention.

Accordingly, it is an object of this invention to provide an improved carrier rack for two-wheeled vehicles that is simple to install and remove, will not affect the balance of the vehicle when the rack is loaded, and allows the driver of the vehicle to drive the vehicle unencumbered.

Another object of this invention is to provide a carrier rack with a hinged, rear additional support surface rotatable to form an angle with a primary substantially horizontal support member, together providing more support surface than present carrier racks.

Another object of this invention is to provide a carrier rack with a primary substantially horizontal support surface and a rotatable secondary support surface which can be secured at various angular positions with primary support surface, to facilitate the support of packages of various shapes and weight distributions.

Another object of this invention is to provide a carrier rack that is lightweight, of simple construction, and maintenance free.

Other objects and advantages of the invention will become apparent upon reading the following detailed description and appended claims, and upon reference to the accompanying drawings.

BRIEF DESCRIPTION OF THE DRAWINGS

FIG. 1 is a side view of the carrier rack in position over the rear wheel of a bicycle.

FIG. 2 is the view from 2—2 in FIG. 1, showing the attachment fixture to secure the carrier rack to the bicycle frame.

FIG. 3 is a perspective view of the carrier rack.

FIG. 4 is an enlarged view of a means to secure the second support surface of the present invention in position.

The package carrier rack (FIGS. 1 and 3) has a primary support member 10 and a secondary rotatable support member 12. The primary support member 10 comprises two elongated tubular portions, 14 and 16, which form a generally U-shaped structure. A plurality of spacing members 18 connect tubular support members 14 and 16. At the closed end of the U-shaped member formed by tubular members 14 and 16 is attachment bracket 20. The attachment bracket 20 is shown in detail in FIG. 2. As shown in FIG. 1, the attachment bracket 20 is fastened to the bicycle seat support 22. It should be noted that the preferred embodiment of the invention is for placement above the rear wheel of a bicycle, but that the present invention may be adapted for placement above the front wheel, and may be used in conjunction with other vehicles, such as mopeds and three-wheeled vehicles.

The secondary rotatable support member 12 is comprised of a pair of tubular members 24 and 26. The tubular members 24 and 26 form a generally U-shaped structure. The closed end of this U-shaped structure is bowed upward from the plane of the tubular members 24 and 26 to form a retaining brace 28. A plurality of spacing members 30 connect tubular support members 24 and 26. The spacing members 30 are generally flat and bowed downward from the plane of the tubular members 24 and 26 to form a basket-like receiving area.

The open end of the generally U-shaped primary support structure 10 and the open end of the U-shaped secondary support structure 12 are fastened together. The tubular member 24 is connected to tubular member 16 at pivotal joint 32 and tubular member 26 is connected to tubular member 14 at pivotal joint 34. This pivotal connection permits the secondary support 12 to be positioned at various angles with respect to the primary support 10.

A pair of adjustable supports 36 and 38 are removably secured to the tubular members 24 and 26, respectively. The adjustable support members 36 and 38 each comprise a large diameter tubular portion 40 and a smaller diameter tubular portion 42, having concentric centers and being adapted so that smaller diameter portion 42 slides snugly within larger diameter portion 40. Either the smaller or larger diameter portion has a plurality of apertures 44 linearly spaced along a portion of its length; the other portion has a single aperture (not illustrated). The overall length of each adjustable support is determined by sliding the small diameter portion 42 with respect to the large diameter portion 44 so that a pair of the apertures overlap. This length is then fixed by inserting a pin 46 through the holes. The free end of each adjustable support 36 or 38 is connected to the frame 48 of the bicycle. Accordingly, the length of adjustable supports 36 and 38 determines the angle of the secondary support 12 relative to the primary support 10. It should be noted that other locking means may be used to secure telescoping portions 40 and 42.

FIG. 2 depicts the attachment bracket 20, which secures the generally U-shaped primary support member 10 to bicycle seat support 20. Owing to its spring-like, curved construction, attachment bracket 20 may be adapted to fit bicycle seat supports of various diameters. A plurality of washers 21, or other spacer means, provide outward pressure on attachment bracket 20 to facilitate the fastening of support members 14 and 16 of the primary support portion 10 to bracket 20 by means of bolt and nut combination 19.

In the illustrated embodiment of the present invention, pivotal point 32 (FIG. 4) comprises a square aperture 31 near the ends of tubular members 14 and 16 at the open end of the generally U-shaped primary support portion 10; an eight-pointed, or double-square, aperture near the ends of tubular members 24 and 26 at the open end of the generally U-shaped secondary rotatable support portion 12; and carriage bolt 29. The five possible positions of secondary rotatable support portion 12, which positions are shown in FIG. 1, are in increments of 45° and are determined by the configuration of pivotal point 34, in particular, the orientation of the eight-pointed, or double-square, aperture 33. The remaining three angular positions permitted by the eight-pointed aperture 33 are precluded from use owing to the presence of the rear wheel of the bicycle and primary support portion 10. In addition to the support effect of carriage bolt 29 engaging apertures 31 and 33 at pivotal point 32, the rotatable support portion 12 is secured in position by the telescoping supporting members 36 and 38. Telescoping supporting members 36 and 38 are adapted to be lockable into the various telescoped positions required by the five available angular positions of secondary rotatable support portion 12. Removable clamp 39, securing telescoping supporting members 36 and 38 to rotatable support portion 12, provides further flexibility in positioning said rotatable support portion 12. FIG. 1 shows how removable clamp 39 may be secured along tubular support members 24 and 26; for example, at the lower depending angular position where rotatable support member 12 is shown in solid lines, clamp 39 is secured a distance (d) from the end of support member 12, whereas in the next available horizontal position clamp 39 is secured at a distance (d') from the end of support member 12. FIG. 1 also shows the support member 12 rotated above the horizontal around to a closed position above and facing the primary support 10.

It should be noted that pivotal point 32 need not be constructed as described above. Alternatively, pivotal point 32 may consist of an ordinary nut and bolt combination securing support portion 10 to support portion 12 through circular apertures in the distal ends of members 14, 16, 24 and 26. In this construction, rotatable support portion 12 would be lockable in a spectrum of positions, rather than in several discrete positions.

From the above description it is apparent that the objects of the present invention have been achieved. While only one embodiment has been illustrated, alternative embodiments and various modifications will be apparent from the above description to those skilled in the art.

For example, the primary and secondary support portions, 10 and 12, may be formed of sheet material, having perhaps short vertical edges for further support. Too, for carrying unusually heavy packages, or if the double-square hole 33 and carriage bolt 29 locking assembly is not employed, additional support members can be added to the invention, the additional support members secured at one end to pivotal point 32 and secured at the other end to the bicycle frame 48 near the axle of the wheel. These and other alternatives are considered equivalents and within the spirit and scope of the present invention.

I claim as my invention:

1. A package-carrier rack for use over the rear wheel of a two-wheel vehicle, the vehicle having a main frame with a support member positioned adjacent to and extending upwardly above said rear wheel, said rack comprising:

an elongated, substantially planar-oriented, primary package-supporting surface having first and second ends and adapted to be placed in a substantially horizontal position above said rear wheel of said vehicle;

fastening means to removably secure the first end of said primary package-supporting surface to said upwardly extending support member of said main frame;

an elongated, substantially planar-oriented, secondary package-supporting surface rotatably connected to the second end of said primary package-supporting surface for movement between a lower position depending angularly downwardly from said primary surface up to at least a horizontal position as an extension of said primary surface;
telescopically adjustable side supporting members for securing said secondary package-supporting surface to said vehicle, said side supporting members being removably connected to said secondary package-supporting surface and extending downwardly on on each side of said rear wheel and being removably fastened to said vehicle near the axle of said wheel.

2. The package-carrier rack of claim 1 wherein said two-wheel vehicle is a bicycle.

3. The package-carrier rack of claim 1 wherein said primary and secondary package-supporting surfaces comprise a frame having a plurality of spacing members.

4. The package-carrier rack of claim 3 wherein the spacing members of the secondary package-supporting surface are concavely formed.

5. The package-carrier rack of claim 1 wherein said secondary package-supporting surface includes an abutment formed near its distal end.

6. The package-carrier rack of claim 1 wherein said side supporting members each comprise first and second concentric interengaging members, permitting telescopic adjustment of the length thereof, and including locking means to releasably secure said side supporting members at a desired telescoped length.

7. The package-carrier rack of claim 6 wherein said secondary package-supporting surface is rotatably connected to said primary package-supporting surface by a carriage bolt and engaging aperture means, to allow the secondary surface to be secured in a fixed number of discrete positions relative to said primary surface.

8. The package-carrier rack of claim 1 including locking means to releasably secure said secondary package-supporting surface in at least said lower position and said horizontal position.

9. The package-carrier rack of claim 1 wherein said side supporting members are connected to said secondary package-supporting surface by a slidably adjustable clamping means.

10. The package-carrier rack of claim 1 wherein said secondary package-supporting surface is rotatable to an angular position above the horizontal.

11. The package-carrier rack of claim 10 wherein said secondary package-forming surface is rotatable to a closed position above and facing said primary package-supporting surface, and includes locking means to releasably secure said secondary package-supporting surface in at least said lower position, said horizontal position and said closed position.

* * * * *